(12) United States Patent
Li

(10) Patent No.: US 9,687,998 B2
(45) Date of Patent: Jun. 27, 2017

(54) FLAT DRILL

(71) Applicants: HANGZHOU GREAT STAR TOOLS CO., LTD, Hangzhou, Zhejiang Province (CN); HANGZHOU GREAT STAR INDUSTRIAL CO., LTD, Hangzhou, Zhejiang Province (CN)

(72) Inventor: Yueming Li, Hangzhou (CN)

(73) Assignees: HANGZHOU GREAT STAR TOOLS CO., LTD., Hangzhou, Zhejiang Province (CN); HANGZHOU GREAT STAR INDUSTRIAL CO., LTD., Hangzhou, Zhejiang Province (CN)

(*) Notice: Subject to any disclaimer, the term of this patent is extended or adjusted under 35 U.S.C. 154(b) by 0 days.

(21) Appl. No.: 14/369,883

(22) PCT Filed: Jan. 23, 2014

(86) PCT No.: PCT/CN2014/071226
§ 371 (c)(1),
(2) Date: Jun. 30, 2014

(87) PCT Pub. No.: WO2015/109485
PCT Pub. Date: Jul. 30, 2015

(65) Prior Publication Data
US 2015/0202792 A1   Jul. 23, 2015

(51) Int. Cl.
*B27G 15/00* (2006.01)
*B23B 51/00* (2006.01)

(52) U.S. Cl.
CPC .......... *B27G 15/00* (2013.01); *B23B 51/0009* (2013.01); *B23B 2251/14* (2013.01); *Y10T 408/899* (2015.01); *Y10T 408/9065* (2015.01)

(58) Field of Classification Search
CPC ............... B27G 15/00; Y10T 408/9065; Y10T 408/899; B23B 51/009; B23B 2251/14; B23B 51/0009
See application file for complete search history.

(56) References Cited

U.S. PATENT DOCUMENTS

| 149,637 A | 4/1874 | Buchter |
| 3,543,820 A * | 12/1970 | Tulumello ............. B27G 15/00 144/219 |

(Continued)

FOREIGN PATENT DOCUMENTS

| CN | 2500448 | 7/2002 |
| CN | 200984763 | 12/2007 |

(Continued)

*Primary Examiner* — Sunil K Singh
*Assistant Examiner* — Paul M Janeski
(74) *Attorney, Agent, or Firm* — Brooks Kushman P.C.

(57) ABSTRACT

A flat drill having a handle, and a flat blade formed in the front portion of the handle part. A front portion of the flat blade extends inwardly from the two sides, forming first and second shoulder. The two shoulders continuing to extend and taper inward and upward, forming two tapered sections respectively, a first tapered section and a second tapered section, and having a pointed top. A first groove is formed on a blade part of the first shoulder toward the inside of the flat blade part. The inner edge of the first groove is inclined downward towards outside direction of the first shoulder, forming an angle of greater than 0 degree with respect to a horizontal line of the flat drill.

17 Claims, 3 Drawing Sheets

(56) References Cited

U.S. PATENT DOCUMENTS

| | | | | |
|---|---|---|---|---|
| 4,286,904 A * | 9/1981 | Porter | ............ | B27G 15/00 408/214 |
| 4,682,917 A * | 7/1987 | Williams, III | ......... | B27G 15/00 408/212 |
| 5,193,951 A * | 3/1993 | Schimke | ............ | B27G 15/00 408/214 |
| 5,286,143 A * | 2/1994 | Schimke | ............ | B27G 15/00 408/211 |
| 5,452,970 A | 9/1995 | Sundstrom et al. | | |
| 7,473,056 B2 | 1/2009 | Durfee | | |
| 2002/0127071 A1 | 9/2002 | Vasudeva | | |
| 2006/0083595 A1* | 4/2006 | Wiker | ............ | B27G 15/00 408/225 |
| 2006/0216123 A1* | 9/2006 | Burdick | ............ | B23B 51/0009 408/211 |
| 2007/0092348 A1* | 4/2007 | Durfee | ............ | B23B 51/0009 408/225 |
| 2008/0101879 A1* | 5/2008 | Durfee | ............ | B23B 51/0009 408/214 |
| 2009/0269155 A1* | 10/2009 | Wang | ............ | B23B 31/008 408/211 |

FOREIGN PATENT DOCUMENTS

| | | |
|---|---|---|
| CN | 200998874 | 1/2008 |
| CN | 203680452 | 7/2014 |
| DE | 2921670 | 12/1980 |
| GB | 2431368 | 4/2007 |
| WO | 2004080632 | 9/2004 |

* cited by examiner

FLAT DRILL

CROSS-REFERENCE TO RELATED APPLICATION

This application is the U.S. national phase of PCT Application No. PCT/CN14/071226 filed on Jan. 23, 2014, disclosure of which is incorporated in its entirety by reference herein.

FIELD OF THE INVENTION

The present invention relates to a drill for drill holes and, more particularly, to a flat drill.

DESCRIPTION OF THE PRIOR ART

Flat drills are usually tools for woodworking drilling. Such drill is easy to control the depth of hole, so it is applicable to drill the shallow holes, and through holes as well, therefore it is widely used for wooden materials or other similar materials.

As shown in FIG. 1, a flat drill usually includes a handle part 1, and a flat blade part 2 with uniform thickness formed in the front part of the handle part, both sides of the front part of the flat blade part extending inwardly along the horizontal lines respectively, and forming a pair of shoulders 21 and 22, the shoulders continuing to extend and taper obliquely upward, forming two tapered parts 23 and 24 respectively, and forming a pointed top 25 at the top part. Starting from the main blade part of the shoulder a groove 211 is formed inward and downward, and the inner edge 212 of the groove is parallel to the shoulder of the flat blade part 2. The function of groove is to export wood after the blade cuts wood.

A flat drill shown in U.S. Pat. No. 5,452,970, two shoulders of the flat drill incline upward radially. Starting from the main blade part of the shoulder a groove is formed inward and downward, and the inner edge of the groove is substantially parallel to the shoulder, inclining upward as well.

In the U.S. Pat. No. 5,452,970, that is one case in which inner edge of groove is parallel to horizontal shoulder of flat blade, the patent disclosing the shape of a groove, thus sawdust being discharged more easily and quickly when using flat drill to drill holes, whereas those skilled in the art have no further in-depth understanding of this structure.

SUMMARY OF THE INVENTION

The invention aims to provide a flat drill, which is capable of further increasing the drilling speed of flat drill.

In order to achieve the above purpose, the invention provides a flat drill, characterized by including a handle part, and a flat blade part which is formed in a front part of the handle part; both sides of the front part of the flat blade part extend inward respectively, forming a pair of shoulders: a first shoulder and a second shoulder; the two shoulders continue to extend and taper inward and upward, forming two tapered parts respectively: a first tapered part and a second tapered part, and forming one pointed top at the top part; a first groove is formed on a blade part of the first shoulder toward the inside of the flat blade part, and an inner edge of the first groove incline downward toward outside direction of the first shoulder, forming an angle of greater than 0 degree with respect to the horizontal line of the flat drill.

The inner edge of the first groove and the horizontal line of the flat drill form an angle of less than or equal to 60 degrees.

The inner edge of the first groove and the horizontal line of the flat drill form an angle of less than or equal to 30 degrees.

The inner edge of the first groove and the horizontal line of the flat drill form an angle of greater than or equal to 2 degrees.

The inner edge of the first groove and the horizontal line of the flat drill form an angle of greater than or equal to 15 degrees and less than or equal to 30 degrees.

A second groove is formed on a blade part of the first tapered part toward the inside of the flat blade part.

The flat blade part is provided with the front face and the back face, the first shoulder and the first tapered part on the front face form the blade part of the first shoulder and the blade part of the first tapered part on the front face respectively, and the second shoulder and the second tapered part on the back face form a blade part of the second shoulder and a blade part of the second tapered part on the back face respectively.

The flat blade part is provided with a first side part and a second side part substantially parallel.

Features of the front face and the back face of the flat blade part are the same.

An inner side part of the second groove is substantially parallel to the blade part of the first tapered part.

The horizontal line is a line substantially perpendicular to the first side part or the second part, or a line parallel to the base of above the hand handle.

The first shoulder and the second shoulder extend inward and substantially perpendicularly from the first side part and the second side part respectively.

The first shoulder and second shoulder incline to extend inward and downward from the two sides of the front part of the flat blade part, forming two shoulders in outward radiate shapes.

The two side parts of the front part of the flat blade part, the corners of the first side part and the second side part both have spines extending upward.

Two sides of the two shoulders of the front part of the flat blade part both have flattened corner parts.

In the tail part of the handle part a hexagon connection part is formed, and the hexagon connection part is further provided with an annular concave.

At the position connected to the hand handle part, a front face and a back face of the flat blade part are slant surfaces inclined relative to axis, with a certain included angle between the front face and the back face.

The depth of the first groove is deeper than that of the second groove.

The first groove is a smooth concave surface.

The smooth concave surface of the first groove includes a first camber surface starting from the blade part of the shoulder, and a second camber surface to the inner side part of the first groove.

The flat drill includes a third flat surface connecting the first camber surface and the second camber surface.

The second groove is an arc surface starting from the blade part of the first tapered part and a surface between the arc surface and the inner side part of the second groove.

Combined with the drawings, the following will provide further instruction to the conception, specific structure, and technical effects of the invention.

DETAILED DESCRIPTION OF THE PREFERRED EMBODIMENTS

Figure 1:
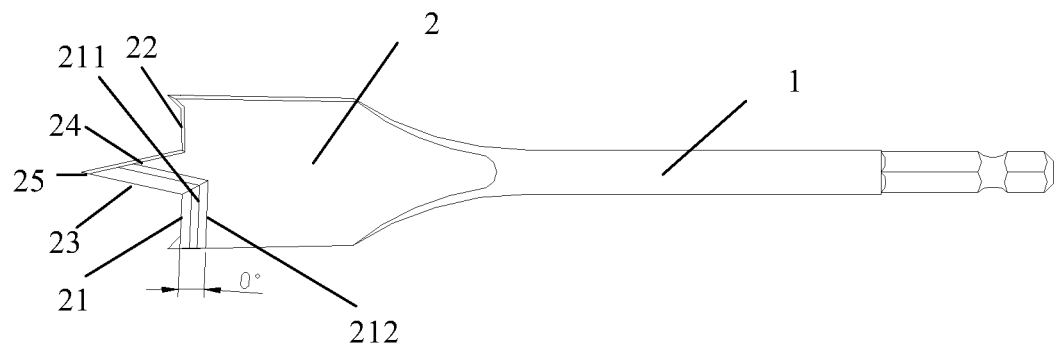
FIG. 1 is a schematic view of prior art.
Figure 2:
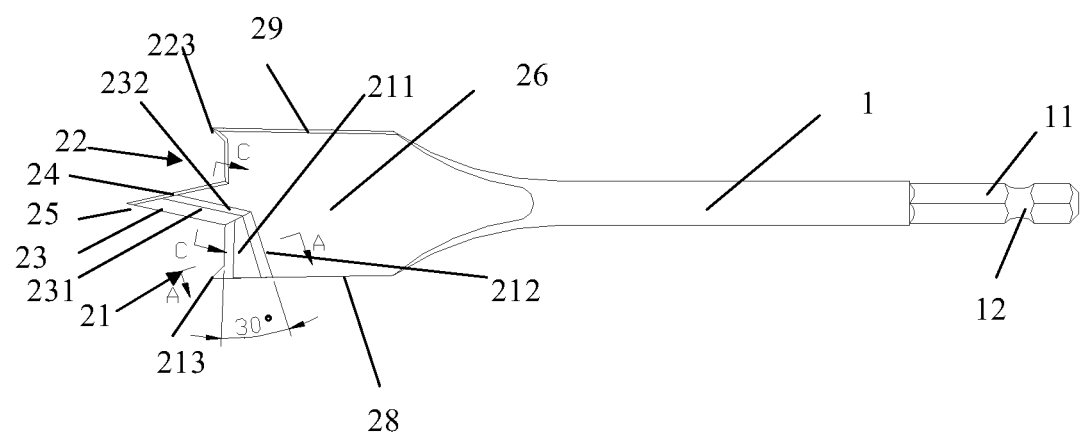
FIG. 2 is a front schematic view of a first embodiment of the invention.

As shown in FIG. 2, the flat drill of the invention includes a handle part 1, and a flat blade part 2 formed in the front part of the handle part, the flat blade part having uniform thickness, both sides of the front part of the flat blade part extending inward respectively, forming two shoulders, a first shoulder 21 and a second shoulder 22, the two shoulders continuing to extend and taper inward and upward, forming two tapered parts respectively, a first tapered part 23 and a second tapered part 24, and forming a pointed top 25 at the top part. A first groove is formed on the blade part of the first shoulder toward the inside of the flat blade part, the inner edge of the first groove inclining downward towards outside direction of the first shoulder, forming an angle of greater than 0 degree with the horizontal line of the flat drill. A second groove is formed on the blade part of the first tapered part toward the inside of the flat blade part.

The flat blade part has the front face 26 and the back face 27, the first shoulder 21 and the first tapered part 23 on the front face forming the blade part of the first shoulder and the blade part of the first tapered part on the front face respectively, the second shoulder 22 and the second tapered part 24 on the back face forming the blade part of the second shoulder and the blade part of the second tapered part on the back face respectively. Thus looking from the front face and the back face, features of the front face and the back face of the flat blade are substantially the same. The flat blade part 2 has a first side part 28 and a second side part 29 substantially parallel. The following will illustrate from the front face.

Looking from the front face, as shown in FIG. 2, the second groove 231 is formed on the blade part of the first tapered part on one side of the front face toward the inside of the flat blade part, the inner side part of the second groove 232 substantially paralleling to the blade part of the first tapered part, forming the first groove 211 in the inside of blade part of the first shoulder on the front side towards the flat blade part, inner edge 212 of the first groove inclining downward towards the direction of side part 28 of the first shoulder on the front side of the flat blade part, forming an angle of greater than 0 degree with respect to the horizontal line of the flat blade part 2. The first groove communicates with the second groove. Horizontal line is a line (virtual) substantially perpendicular to the side part 28 or 29, or a line parallel to the base of above the hand handle.

Figure 6:
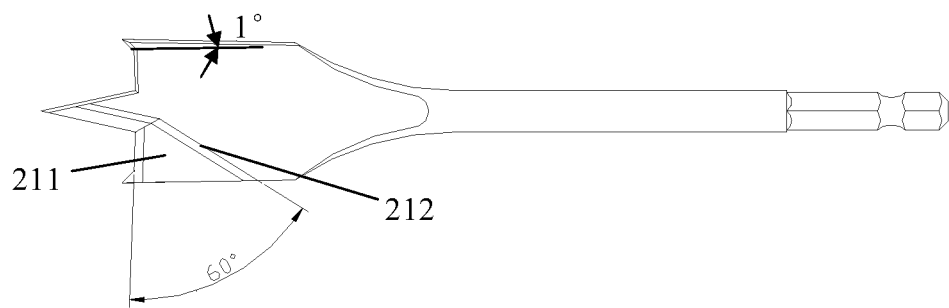
FIG. 6 is a schematic view of a second embodiment of the invention.

In this specific embodiment, the first shoulder 21 and the second shoulder 22 extend inward and substantially perpendicularly from the first side part 28 and the second side part 29 respectively, thus the shoulders parallel to or coincide with the horizontal line, therefore as shown in FIG. 2, the inner side part 212 of the second groove and the shoulders form an angle of greater than 0 degree, 30 degrees shown specifically in FIG. 2 and 60 degrees shown specifically in FIG. 6. The greater angle will cause a problem that intensity of the blade is not big enough, and yet too small angle cannot greatly increase the speed, so the superior angle is 0 to 60 degree angle, more superior angle is 0 to 30 degree angle, or an angle of greater than 2 degrees, and the optimal angle is 15 to 30 degree angle.

The main function of the first groove and the second groove are exporting wood after the blade cuts wood, in case drill hole is blocked. However it is an unfound problem that the shape of the inner side part of the first groove will affect the drilling speed.

The first groove inclines downward towards the side part direction of the blade, and the inner edge of the first groove and the line form an angle of greater than 0 degree, thereby drilling speed is faster, which is one of the important discoveries of the present invention.

The two side parts of the front part of the flat blade part 2, the corners of the first side part and the second side part, namely two shoulder parts, the first shoulder and the second shoulder can also have spines 213 and 223 extending upward as shown in FIG. 2. The design of spines can make the flat drill bore holes with neatly smooth outer edge.

Figure 7:
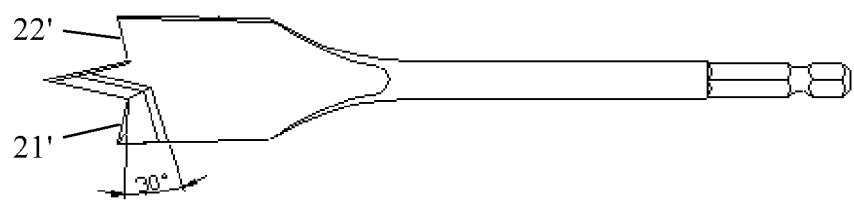
FIG. 7 is a schematic view of a third embodiment of the invention.

Optionally, as shown in FIG. 7, the first shoulder part 21' and the second part 22' can also extend obliquely inward and downward from the two sides of the front part of the flat blade part 2, forming shoulders in outward radiate shapes. This design of shoulders is conducive to a better cutting.

Figure 8:
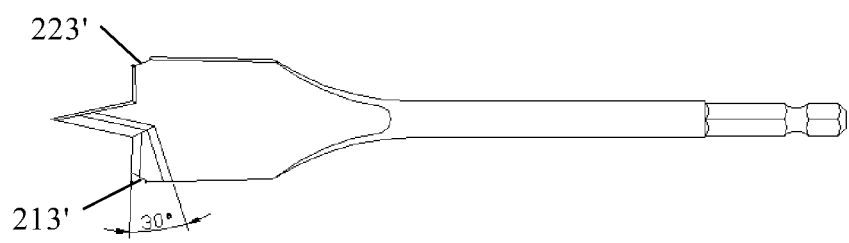
FIG. 8 is a schematic view of a fourth embodiment of the invention.

Optionally, as shown in FIG. 8, two sides of the two shoulders of the flat blade part 2 can also have flattened corner parts 213' and 223'. This can reduce product debris when drilling holes, thus guarantee the quality and cleanliness of the hole after drilling, and reduce the energy loss in the borehole and the accumulation of debris.

In the tail part of the handle part a hexagon connection part 11 is formed, which can be connected with electric or manual tools, thus making the flat drill rotate in the material which needs drilling, so as to achieve the purpose of drilling. The hexagon connection part also has an annular concave 12, which can be used by matching the drill on the market at present.

Figure 3:
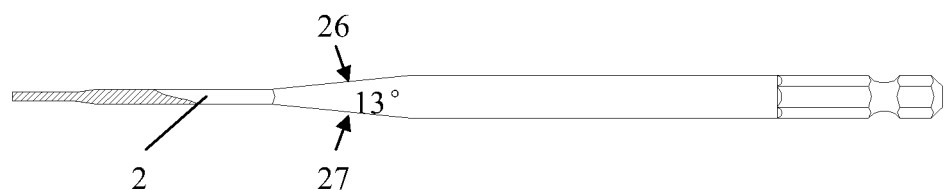
FIG. 3 is a side view of the first embodiment of the invention.

As shown in the lateral view of FIG. 3, at the position connected to the hand handle part, the front face 26 and the back face 27 of the flat blade part are slant surfaces inclined relative to axis, with a certain included angle between the front face and the back face, in the example shown in the figure, specific of 13 degrees.

The depth of the first groove 211 is deeper than that of the second groove 231, so at the joint of the second groove 231 and the first groove 211 a step is formed, wherein the second groove higher than the first groove.

Figure 4:
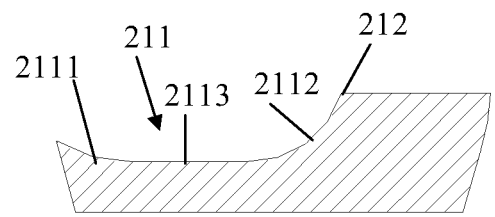
FIG. 4 is a sectional view of A-A surface of FIG. 2.

A sectional view of A-A surface in FIG. 2 seen from FIG. 4, shows the sectional structure of the first groove. As can be seen from the drawing, the first groove is a smooth concave surface, convenient to export wood, increase drilling speed, and reduce energy consumption. As shown in the drawing, the smooth concave surface of the first groove in the drawing includes a first camber surface 2111 which can be a certain radius of circular arc, starting from the blade part of the shoulder, and a second camber surface 2112 which can be a circular arc with different radius from that of the first camber surface, to the inner side part of the first groove. It can also include between the two camber surfaces, a third flat surface 2113 connecting the first camber surface and the second camber surface, and the third surface can also have a certain radian.

Figure 5:
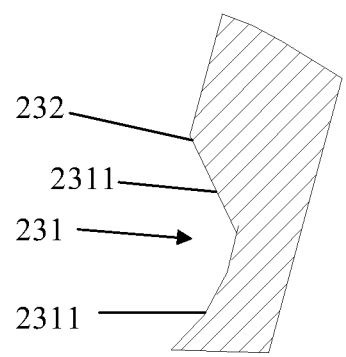
FIG. 5 is a sectional view of C-C surface of FIG. 2.

A sectional view of C-C surface in FIG. 2 seen from FIG. 5, shows the sectional structure of the second groove. The second groove can also be a smooth concave surface. As can be seen from the drawing, the second groove is an arc surface 2311 starting from the blade part of the first tapered part and a surface 2311 between the arc surface 2311 and the inner part 232 of the second groove, and wherein the surface 2311 can be a plane as shown in FIG. 5, or an arc surface.

The following table is a comparison test report of testing hard miscellaneous wood materials, test pressure in 18 pounds, test depth of 40 mm, rotation speed of 680, and each sample punching 5 continuously on wood. Angle therein is the angle between the inner side part of the first groove and horizontal line. It can be seen that No. 1 sample is the sample of existing technology, and samples from No. 2 to No. 5 are different embodiments in the present invention. It is observed that the average punching speed of No. 5 sample is the fastest.

Removal chips of samples from No. 1 to No. 3 are all in sheet body shapes. Removal chips of samples from No. 4 to No. 5 both have a continuous rolled phenomenon, which causes block easily and is not conducive to remove chips. Samples from No. 1 to No. 3: the angle is smaller, the edge distance is shorter, and the strength of cutting blade is better, so the cutting blade is not easy to distort when cutting for sufficient strength. Samples from No. 4 to No. 5: the angle is greater, the edge distance is longer, the sectional view of cutting edge is thin, and the cutting strength is not enough, which will distort the blade easily and cause security incidents, and large area of under pressure of blade is bad for processing, so an angle of 15-30 degrees in batch production is suggested.

| Model | Test Time |
| --- | --- |
| No. 1 sample (Angle of 0 degree) | The fastest for 60 seconds The slowest for 73 seconds |
| No. 2 sample (Angle of 15 degrees) | The fastest for 35 seconds The slowest for 40 seconds |
| No. 3 sample (Angle of 30 degrees) | The fastest for 30 seconds The slowest for 38 seconds |
| No. 4 sample (Angle of 45 degrees) | The fastest for 31 seconds The slowest for 37 seconds |
| No. 5 sample (Angle of 60 degrees) | The fastest for 27 seconds The slowest for 33 seconds |

The above describes comparatively good embodiments in the present invention in detail. It should be understood that, common technical personnel in the field can make many modifications and changes according to the conception of the present invention without creative work. Therefore, all of the technical proposals which can be obtained by technical personnel in the technical field through logical analysis, reasoning or limited experiments on the basis of the existing technology and in accordance with the present invention conception, should be within the scope of protection determined by the claims.

The invention claimed is:

1. A flat drill comprising:
   a handle part, and
   a flat blade part which is formed in a front part of the handle part, the front part of the flat blade part extending inward respectively from two side parts, forming two shoulders: a first shoulder and a second shoulder; the two shoulders continuing to extend in a direction away from the handle part and taper inward, forming two tapered parts respectively: a first tapered part and a second tapered part, and forming one pointed top at a top part;
   a first groove being formed on a blade part of the first shoulder toward an inside of the flat blade part, and an inner edge of the first groove inclining downward toward the side part of the blade part near the first shoulder, forming an angle of greater than 0 degree with respect to a horizontal line of the flat drill;
   a second groove is formed on a blade part of the first tapered part toward the inside of the flat blade part;
   wherein, a depth of the first groove is deeper than that of the second groove; the first groove is a smooth concave surface; the smooth concave surface of the first groove comprises a first camber surface starting from the blade part of the shoulder, and a second camber surface to the inner side part of the first groove, further comprises a third flat surface connecting the first camber surface and the second camber surface; the second groove is an arc surface starting from the blade part of the first tapered part and a surface between the arc surface and the inner part of the second groove.

2. The flat drill according to claim 1, characterized in that, the inner edge of the first groove and the horizontal line of the flat drill form an angle of less than or equal to 60 degrees.

3. The flat drill according to claim 1, characterized in that, the inner edge of the first groove and the horizontal line of the flat drill form an angle of less than or equal to 30 degrees.

4. The flat drill according to claim 1, characterized in that, the inner edge of the first groove and the horizontal line of the flat drill form an angle of greater than or equal to 2 degrees.

5. The flat drill according to claim 1, characterized in that, the inner edge of the first groove and the horizontal line of the flat drill form an angle of greater than or equal to 15 degrees and less than or equal to 30 degrees.

6. The flat drill according to claim 1, characterized in that, the flat blade part is provided with a front face and a back face, the first shoulder and the first tapered part on the front face form the blade part of the first shoulder and the blade part of the first tapered part on the front face respectively, and the second shoulder and the second tapered part on the back face form a blade part of the second shoulder and a blade part of the second tapered part on the back face respectively.

7. The flat drill according to claim 6, characterized in that, the flat blade part is provided with a first side part and a second side part substantially parallel.

8. The flat drill according to claim 7, characterized in that, features of the front face and the back face of the flat blade are the same.

9. The flat drill according to claim 8, characterized in that, an inner side part of the second groove is substantially parallel to the blade part of the first tapered part.

10. The flat drill according to claim 9, characterized in that, the horizontal line is a line substantially perpendicular to the first side part or the second part, or a line parallel to a base of above the hand handle.

11. The flat drill according to claim 1, characterized in that, the first shoulder and the second shoulder extend inward and substantially perpendicularly from the first side part and a second side part respectively.

12. The flat drill according to claim 1, characterized in that, the first shoulder and a second shoulder incline to extend inward and downward from the two sides of the front part of the flat blade part, forming two shoulders in outward radiate shapes.

13. The flat drill according to claim 1, characterized in that, the two side parts of the front part of the flat blade part, side corners of the first side part and a second side part both have spines extending upward.

14. The flat drill according to claim 1, characterized in that, two sides of the two shoulders of the front part of the flat blade both have flattened corner parts.

15. The flat drill according to claim 1, characterized in that, in a tail part of the handle part a hexagon connection part is formed, and the hexagon connection part is further provided with an annular concave.

16. The flat drill according to claim 6, characterized in that, at a position connected to a hand handle part, a front face and a back face of the flat blade part are slant surfaces inclined relative to axis, with a certain included angle between the front face and the back face.

17. The flat drill according to claim 1, wherein an inner side part of the second groove substantially paralleling to the blade part of the first tapered part.

\* \* \* \* \*